United States Patent
Dorer et al.

(10) Patent No.: US 6,399,532 B1
(45) Date of Patent: Jun. 4, 2002

(54) POLYMERIZATION CATALYST

(75) Inventors: Birgit Angelika Dorer, Mutterstadt (DE); David Pratt, Egham; Christopher Sharp, Staines, both of (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/477,677

(22) Filed: Jan. 5, 2000

Related U.S. Application Data

(63) Continuation of application No. PCT/GB98/01914, filed on Jun. 30, 1998.

(30) Foreign Application Priority Data

Jul. 5, 1997 (DE) ............................................. 9714181

(51) Int. Cl.⁷ ............................................... B01J 31/00
(52) U.S. Cl. ...................... 502/117; 502/103; 502/113; 502/114; 502/115; 502/118; 502/119; 502/128; 502/152; 502/153; 502/154; 502/171
(58) Field of Search ................................ 502/103, 113, 502/114, 115, 117, 118, 119, 128, 152, 153, 154, 171

(56) References Cited

U.S. PATENT DOCUMENTS 5,434,115 A * 7/1995 Yamada et al. ............. 502/103

FOREIGN PATENT DOCUMENTS

| EP | 0 570 982 | 11/1993 |
| WO | WO 91/14713 | 10/1991 |

OTHER PUBLICATIONS

Tetsunosuke, S., "Polymerization of Olefin", Patent Abstracts of Japan—JP 05 097923, Apr. 20, 1993, (Abstract Only).
Katsumi, H., "Method for Polymerizing Olefin", Patent Abstracts of Japan—JP 05 295021, Nov. 9, 1993, (Abstract Only).

* cited by examiner

*Primary Examiner*—Elizabeth D. Wood
(74) *Attorney, Agent, or Firm*—Finnegan, Henderson, Farabow, Garrett and Dunner, L.L.P.

(57) ABSTRACT

Catalyst composition for use in the polymerization of olefins comprise neutral metal complexes together with activators comprising non-aromatic boron compounds. Suitable activators are triisobutylboron together with trialkylaluminium compounds. Preferred complexes are metallocenes. The use of such activating systems obviates the need for expensive aluminoxanes or aromatic fluorine containing compounds.

13 Claims, No Drawings

POLYMERIZATION CATALYST

RELATED APPLICATION

This application is a continuation of International Application No. PCT/GB98/01914, filed Jun. 30, 1998.

BACKGROUND OF THE INVENTION

The present invention relates to discrete metal complexes and to their use in catalyst compositions suitable for the polymerisation of olefins and in particular the invention relates to catalyst compositions comprising a discrete metal complex and an activator based on a boron compound.

The use of discrete metal complex based olefin polymerisation catalysts is well-known. For example metallocene based olefin polymerisation catalysts are well-known. Examples of such catalysts may be found in EP 129368, EP 206794, and EP 260130. Typically the metallocene complex comprises a bis(cyclopentadienyl) zirconium complex for example bis(cyclopentadienyl) zirconium dichloride or bis (tetramethylcyclopentadienyl) zirconium dichloride.

In such catalyst systems the discrete metal complex is used in the presence of a suitable activator. The activators most suitably used with such discrete metal complexes are aluminoxanes, most suitably methyl aluminoxane or MAO. Other suitable activators are perfluorinated aromatic boron compounds such as tris(pentafluorophenyl) boron or trialkylammonium tetrakis (pentafluorophenyl) borates.

It would however be beneficial to be able to use simpler and less costly activators with these discrete metal complexes than the traditional activators such as aluminoxanes or aromatic based boron compounds.

SUMMARY OF THE INVENTION

We have now found catalyst systems based on discrete metal complexes which comprise non-aromatic boron cocatalysts or activators. Such activators are less costly, safer materials to handle and lead to polymer products which do not contain aromatic or fluorine residues.

Thus according to the present invention there is provided a catalyst composition suitable for use in the polymerisation of olefins said composition comprising:

(A) a neutral discrete metal complex,
(B) a boron compound of formula:

$$B(X)_3$$

wherein X is hydride, halide, alkyl, a chelating ligand or a macrocyclic ligand, and each X can be the same or different, and (C) a compound of formula $$M(X)_3$$

wherein M is a Group IA, IIA, or IIIA metal excluding boron and X is as defined above.

The preferred compound (B) has the formula $$B(R)_{3-x}X_x$$

wherein R is alkyl and x is 0 to 3.

A most preferred compound (B) is wherein R is isobutyl for example triisobutylboron.

The preferred compound (C) has the formula $$M(R)_yX_z$$

wherein R is alkyl, y is at least 1, z is an integer to satisfy the valency of M and X is as defined above.

A most preferred compound (C) is wherein R is isobutyl for example triisobutylaluminium.

DETAILED DESCRIPTION OF THE INVENTION

The discrete metal complexes suitable for use in the present invention have the general formula:

$$(L)_pMY_nX_m$$

where L represents a ligand which remains bound to M under olefin polymerisation conditions, M is a Group IIIA element or, Group IIIB, IVB, VB, VIB or VIII transition metal, and Y is an anionic ligand and may suitably be chosen from the group comprising hydride, halide, alkyl, aryl and may be the same or different.

Alternatively the Y ligand may be a group containing at least one atom from O, S N, and P bound directly to M.

X is a neutral Lewis base n >or= 1 p >or= 1 m >or= 0.

The Y group for example may be triflate, perchlorate or may be a chelating ligand for example acetylacetonate or similar.

One type of metal complex suitable for use in the present invention are metallocene complexes having the formula:

$$(Cp)_pMY_n$$

where Cp represents an unsubstituted or substituted cyclopentadienyl ligand,

M is a Group IVB, VB, VIB or VIII transition metal, and

Y is as defined above, and p is 1–3 and n is 1–3.

Preferred complexes are those wherein M is zirconium, hafnium or titanium.

When substituted the cyclopentadienyl ligand may comprise two substituents joined together for example an indenyl group.

Suitable substituents on the cyclopentadienyl ligand are alkyl for example methyl.

The Y ligand may suitably be chosen from the group comprising hydride, halide, alkyl, aryl and may be the same or different. Alternatively the Y ligand may be a group containing at least one atom from O, S N, and P bound directly to M, for example triflate, perchlorate, or may be chelating for example acetylacetonate or similar.

Particularly preferred complexes are those having the formula $(Cp)_2ZrY_2$.

Preferred complexes of this type are those wherein the Y group is halide or triflate.

The metallocene complex may also comprise complexes in which the cyclopentadienyl ligands are joined together via a bridging group of formula:

$$Cp-(R_2Z)_p-Cp$$

wherein Z is silicon, germanium or carbon, p is an integer from 1–8, R is hydrogen, or a group selected from hydrocarbyl or combinations thereof and Cp is as defined above. A preferred bridging group is $CH_2CH_2$.

Also suitable for use as the complex in the present invention are complexes having a single cyclopentadienyl ring ligand and a hetero atom bonded to the metal. Such complexes are referred to as 'constrained geomety' complexes and are described in EP 420436 and EP 416815 the disclosures of which are incorporated herein by reference. Also suitable are complexes which have the metal in the +2 oxidation state. Such complexes are disclosed in WO 95/00526 and WO 96/04920 the disclosures of which are incorporated herein by reference.

The catalyst compositions according to the present invention may be suitably supported. For example the discrete metal complexes may be impregnated on a catalyst support for example silica, alumina, or magnesium chloride. The preferred support is silica. Preparation of supported catalysts may be carried out by conventional techniques.

The catalyst compositions according to the present invention may also comprise another catalyst component for example a Ziegler catalyst or another discrete metal complex. For example a multisite catalyst composition may be used comprising a supported metallocene complex and activator according to the present invention together with a Ziegler catalyst eg a catalyst comprising atoms of titanium, magnesium and halogen.

The present invention also provides a process for the production of polyolefins, in particular homopolymers of ethylene and copolymers of ethylene with minor amounts of at least one C3 to C10, preferably C3 to C8 alpha-olefin. The process comprises contacting the monomer or monomers, optionally in the presence of hydrogen, with the catalyst composition according to the invention at a temperature and pressure sufficient to initiate the polymerisation reaction.

Suitably the alpha olefin may be propylene, butene-1, hexene-1, 4-methyl pentene-1 and octene-1.

The olefin polymerisation catalyst compositions according to the present invention may be used to produce polymers using solution polymerisation, slurry polymerisation or gas phase polymerisation techniques. Methods and apparatus for effecting such polymerisation reactions are well known and described in, for example, Encyclopaedia of Polymer Science and Engineering published by John Wiley and Sons, 1987, Volume 7, pages 480 to 488 and 1988, Volume 12, pages 504 to 541.

The catalyst composition of the present invention is most suitable for use in gas phase processes.

When used as a catalyst composition for the polymerisation of olefins the boron compound (B) according to the present invention may be used in an amount ranging from 0.01 to 1000 times the amount of complex (A) preferably 0.1 to 200 times the amount of complex (A).

The catalyst composition according to the present invention can be used in similar amounts and under similar conditions to known olefin polymerisation catalysts.

The polymerisation may optionally be carried out in the presence of hydrogen. Hydrogen or other suitable chain transfer agents may be used to control the molecular weight of the produced polyolefin.

The present invention will now be further illustrated by reference to the following examples which show the usefulness of the catalyst composition according to the present invention as alternatives to traditional systems which rely on expensive aluminoxanes or activators containing aromatic fluorine residues.

EXAMPLE 1

A 1 liter stainless steel autoclave was heated to 85° C. and thoroughly purged with nitrogen (21/min) for 105 min. The temperature was then reduced to 50° C. and the reactor charged with trilsobutylaluminium (5 ml, 1.0 M in toluene) and iso-butane (500 ml). The mixture was stirred (200 rpm) at 75° C. for 230 minutes and 10 bar overpressure of ethylene was then added. To this was injected 1.1 ml of a catalyst solution prepared by dissolving 5.1 mg of [Zr(1,3-Me$_2$Cp)$_2$(OTf)$_2$] in 10.0 ml of dry toluene, adding 0.25 ml of B(iBu)$_3$ (0.35 M in toluene) and allowing the two to react for 30 min. The polymerisation was carried out for 60 min during which time the ethylene pressure was maintained at 10 bar. The yield of polyethylene was 42 g. Note OTf= trifluoromethanesulfonate.

EXAMPLE 2

A 1 liter stainless steel autoclave was heated to 85° C. and thoroughly purged with nitrogen (21/min) for 90 min. The temperature was then reduced to 50° C. and the reactor charged with triisobutylaluminium (4 ml, 1.0 M in toluene) and iso-butane (500 ml). The mixture was stirred (200 rpm) at 85° C. for 145 minutes and 10 bar overpressure of ethylene was then added. To this was injected 2.0 ml of a catalyst solution prepared by dissolving 15.0 mg of [Zr(1,3-Me$_2$Cp)$_2$(OTf)$_2$] in 50.8 ml of dry toluene, adding 1.3 ml of B(iBu)$_3$ (0.2 M in toluene) and allowing the two to react for 26 min. The polymerisation was carried out for 62 min during which time the ethylene pressure was maintained at 10 bar. The yield of polyethylene was 26 g. Note: OTf= Trifluoromethanesulfonate.

EXAMPLE 3

A 1 liter stainless steel autoclave was heated to 85° C. and thoroughly purged with nitrogen (21/min) for 90 min. The temperature was then reduced to 50° C. and the reactor charged with triisobutylaluminium (4 ml, 1.0 M in toluene) and iso-butane (500 ml). The mixture was stirred (200 rpm) at 85° C. for 150 minutes and 10 bar overpressure of ethylene was then added. To this was injected 3.0 ml of a catalyst solution prepared by dissolving 10.3 mg of [Zr(1,3-Me$_2$Cp)$_2$(Cl)$_2$] in 52.8 ml of dry toluene, adding 0.9 ml of B(iBu)$_3$ (0.2 M in toluene) and allowing the two to react for 35 min. The polymerisation was carried out for 61 min during which time the ethylene pressure was maintained at 10 bar. The yield of polyethylene was 41 g.

We claim:

1. A catalyst composition suitable for use in the polymerization of olefins comprising:

(A) a neutral discrete metallocene complex (B) a boron compound of formula $$B(X)_3$$

wherein X is alkyl, a chelating ligand or a macrocyclic ligand, and each X may be same or different, and (C) a compound of formula $$M(X)_3$$

wherein M is a Group IA, IIA or IIIA metal excluding boron and X is as defined for (B).

2. A catalyst composition according to claim 1 wherein the boron compound (B) has the formula $$B(R)_{3-x}X_x$$

wherein R is alkyl and x is 0–3.

3. A catalyst composition according to claim 1 wherein the boron compound (B) is triisobutylboron.

4. A catalyst composition according to claim 1 wherein the compound (C) has the formula $$M(R)_yX_z$$

wherein R is alkyl, y is at least 1 and z is an integer which satisfies the valency of M and wherein M is a Group IA, IIA of IIIA metal excluding boron and X is alkyl, a chelating ligand or a macrocyclic ligand and each X may be the same or different.

5. A catalyst composition according to claim 4 wherein the compound (C) is triisobutylaluminium.

6. A catalyst composition according to claim 1 wherein the neutral discrete metallocene complex has the formula $$(L)_p MY_n X_m$$

wherein L represents a ligand which remains bound to M under olefin polymerization conditions, M is a Group IIIA element, or Group IIIB, IVB, VB, VIB or VIII transition metal, and Y is an anionic ligand selected from the group consisting of hydride, halide, alkyl, aryl and a group containing at least one atom selected from O, S, N and P bound directly to M, and each Y may be the same or different X is a neutral Lewis base n ≦ or =1 p ≦ or =1, and m ≦ or =0.

7. A catalyst composition according to claim 6 wherein the complex has the formula $$(Cp)_p MY_n$$

wherein Cp represents an unsubstituted or substituted cyclopentadienyl ligand,

M is a Group IVB, VB, VIB or VIII metal,

Y is an anionic ligand selected from the group consisting of hydride, halide, alkyl, aryl and a group containing at least one atom selected from O, S, N and P bound directly to M and each Y may be the same or different, p is 1–3, and n is 1–3.

8. A catalyst composition according to claim 7 wherein the complex has the formula $$Cp_2 ZrY_2$$

9. A catalyst composition according to claim 7 wherein M is titanium, zirconium or hafnium, and Y is halide or triflate.

10. A catalyst composition according to claim 1 additionally comprising a support.

11. A catalyst composition according to claim 10 wherein the support is silica.

12. A catalyst composition according to claim 1 additionally comprising another catalyst component.

13. A catalyst composition according to claim 12 wherein the other catalyst component is a Ziegler catalyst.

* * * * *

UNITED STATES PATENT AND TRADEMARK OFFICE
CERTIFICATE OF CORRECTION

PATENT NO. : 6,399,532 B1
DATED : June 4, 2002
INVENTOR(S) : Dorer et al.

Page 1 of 1

It is certified that error appears in the above-identified patent and that said Letters Patent is hereby corrected as shown below:

Title page,
Item [30], Foreign Application Priority Data, "(DE)" should read -- (GB) --.

Column 5,
Line 3, "of IIIA" should read -- or IIIA --.
Line 22, "$n \leq$" should read -- $n >$ --.
Line 23, "$p \leq$" should read -- $p >$ --.
Line 24, "$m \leq$" should read -- $m >$ --.

Column 6,
Line 7, after "directly to M", insert a comma.

Signed and Sealed this

Fourth Day of January, 2003

JAMES E. ROGAN
*Director of the United States Patent and Trademark Office*